May 8, 1956  R. N. HIPP  2,744,643
TILTABLE BODY TRAILER
Filed Dec. 3, 1953  2 Sheets-Sheet 1
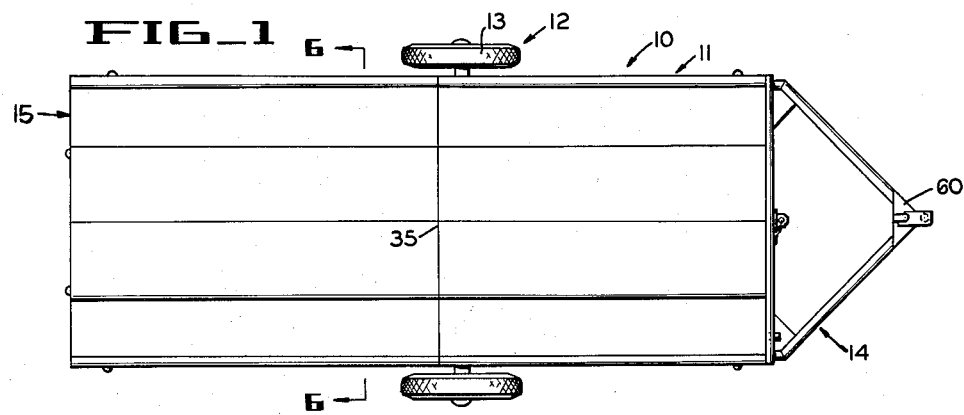
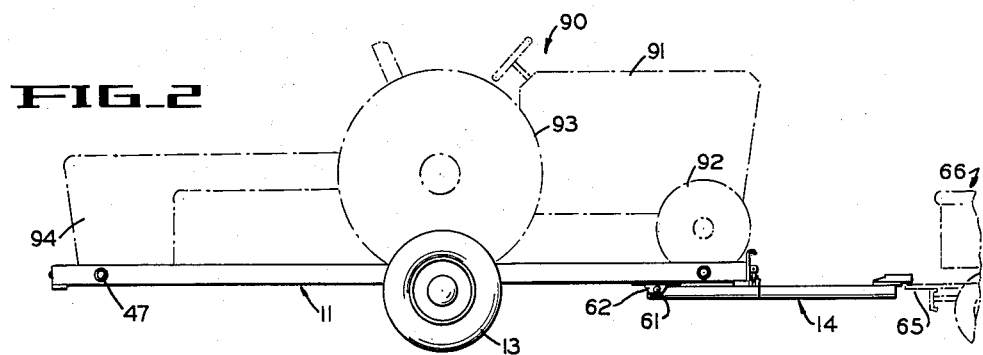
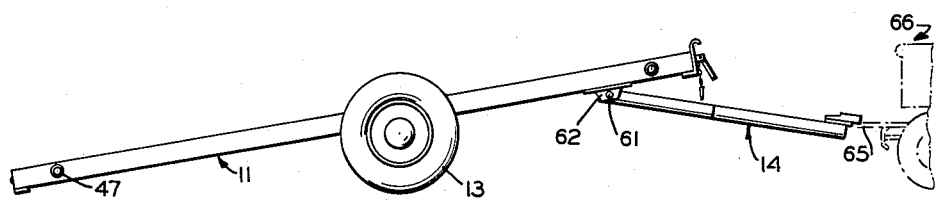
INVENTOR.
RONALD N. HIPP
BY
ATTORNEY May 8, 1956
R. N. HIPP
2,744,643
TILTABLE BODY TRAILER
Filed Dec. 3, 1953
2 Sheets-Sheet 2
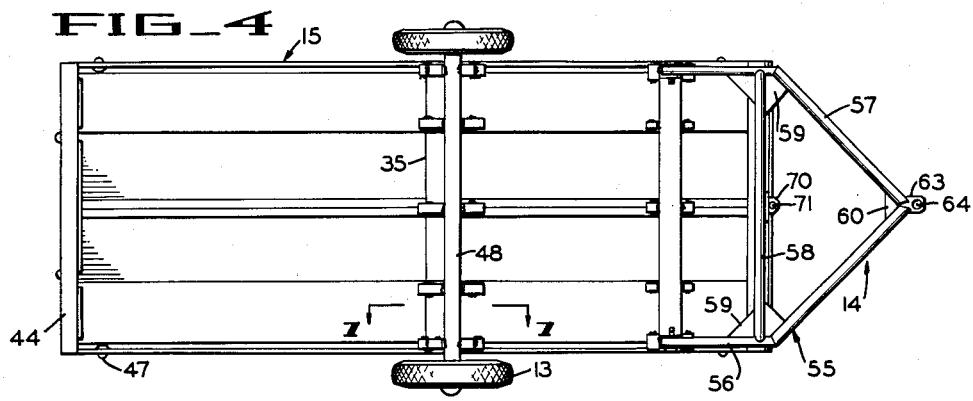
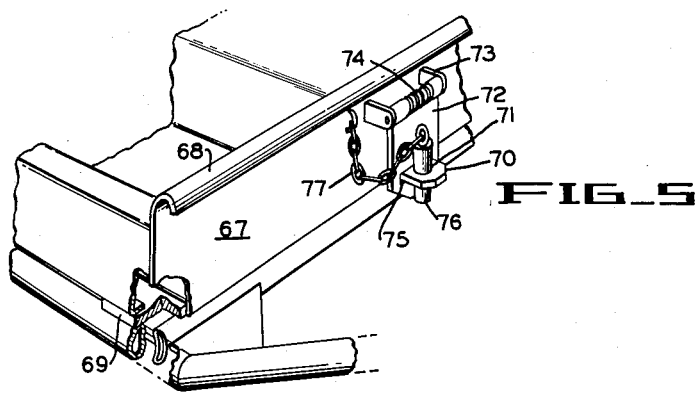
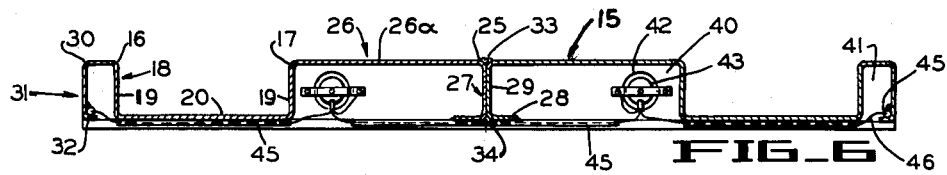
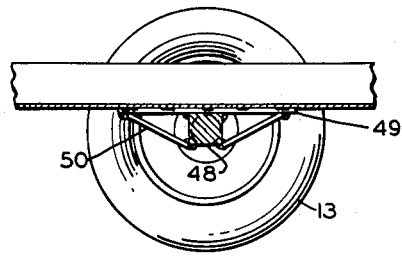
INVENTOR.
RONALD N. HIPP
BY
ATTORNEY 2,744,643
Patented May 8, 1956

2,744,643
TILTABLE BODY TRAILER
Ronald N. Hipp, Menlo Park, Calif.

Application December 3, 1953, Serial No. 395,951

2 Claims. (Cl. 214—506)

This invention relates to a trailer. More particularly, it relates to a light weight, shallow bed trailer of simple economical construction which is adapted to transport small tractors and other like vehicles.

Tractors of the type represented by the well-known Ferguson tractor are employed extensively in the construction industry and for such purposes as propelling bulldozers, scrapers and other earth moving machinery. These tractors are ridable and are self-propelled, and they can be transported from one location to another under their own power. However, such tractors are geared quite low, hence can be moved only at low speed. Also, such tractors are generally rather uncomfortable to ride over bumpy roads or for long distances.

Accordingly, it is a common practice in the industry to transport a tractor of this type from one location to another, particularly where the locations are far apart, by loading the tractor onto a trailer and hitching the trailer to a road type tractor or truck.

Most trailers are not well adapted for this particular purpose. Thus the beds of many such trailers are relatively high, which makes loading and unloading the tractor difficult. Also tractors employed for this purpose heretofore have been relatively bulky, heavy and expensive.

It is an object of the present invention to provide an improved form of trailer adapted to transport small tractors of the type discussed above.

Another object of the invention is to provide a trailer which is particularly adapted for loading and unloading tractors of the type mentioned.

Yet another object of the invention is to provide a low bed, light weight tractor of simple design and construction which is adapted to carry a relatively heavy load and which is particularly adapted to transport a wheeled vehicle such as a tractor of the type mentioned herein above.

These and other objects of the invention will be apparent from the ensuing description and the appended claims.

One form of the invention is illustrated by way of example in the accompanying drawings, in which Figure 1 is a top plan view of the trailer of the invention.

Figure 2 is a side elevation of the same showing the trailer hitched to a truck or road tractor and also showing a grading type of tractor mounted on the trailer.

Figure 3 is a view similar to that of Figure 2 but showing the trailer without a load thereon and in position for loading or unloading.

Figure 4 is a bottom view of the trailer of Figure 1.

Figure 5 is a fragmentary, perspective view showing certain details of the hitch assembly.

Figure 6 is a transverse section taken along the line 6—6 of Figure 1.

Figure 7 is a longitudinal section taken along the line 7—7 of Figure 4.

Referring now to the drawings and more particularly to Figures 1, 2 and 3, the trailer of the present invention is generally designated by the reference numeral 10, and it comprises a body 11, a carriage 12 comprising traction wheels 13 and a hitch assembly 14.

Referring now more particularly to Figures 1 and 6, the body 11 consists of four identical body units which are generally designated by the reference numeral 15, these units being formed in the manner illustrated and explained in detail hereinafter, being arranged in abutting relationship and being welded together as described in detail hereinafter. The units 15 are preferably constructed of sheet steel of sufficient thickness, e. g., ten gauge, to provide adequate strength.

Referring now more particularly to Figure 6, it will be seen that each of the body units 15 is bent longitudinally at 16 and 17 to provide a longitudinal channel 18 having side walls 19 and a bottom or bed 20, and that each of these body units is also bent at 25 to form an inverted channel 26 providing a deck 26a. Also each of the body units 15 is formed along its inner edge with a channel 27 which is formed by the deck 26a, a leg 28 and a web portion 29. Along its outer edge each of the body units 15 is bent at 30 to provide an inverted channel 31, and the extreme outer edge of each body unit is bent underneath at 32 to form a lip.

As stated hereinabove, the body units 15 are arranged in abutting relationship, and as will be seen they are secured together by longitudinal welds 33 and 34 and by transverse welds 35.

The rearward end of the body 11, which is best shown in Figure 6, is partially closed by means of end plates 40 which close the rearward ends of the inverted channels 26 and end plates 41 which close the rearward ends of the inverted channels 31. The end plates 40 are formed with holes 42 to receive tail lights 43. Conduits 45 extend about the perimeter of the body 11 but are concealed and protected in the manner illustrated by the channels 31. A wire 46 extends through the conduits 45 and connects with the tail lights 43 and also with the clearance lights 47 (see Figures 2 and 4). The other terminal of each of the lights is connected to the frame, which serves as a common ground connection.

Referring now more particularly to Figures 4 and 7, the carriage 12 includes a square beam or axle 48 extending transversely of the body 11 and somewhat forwardly of the transverse weld 35. The axle 48 is welded to longitudinal plates 49 which, in turn, are welded to the body 11. It receives further support by means of diagonal plates 50 which are welded to the longitudinal plates 49 and to the axle 48.

Referring now more particularly to Figures 1, 4 and 5, the above-mentioned hitch assembly 14 comprises an A frame 55 which is constructed primarily of tubular steel members, two of which are designated as 56 and constitute parallel longitudinal members and two of which are designated as 57 constitute diagonal members. A transverse reinforcing member 58 is also provided, as are gussets 59 and 60. These elements are suitably welded together to provide a sturdy A frame. The A frame 55 is pivotally connected at 61 to brackets 62 which are welded to the body 11. A hitch member 63 is provided at the forward end or apex of the A frame 55 and is formed with a hole 64 by means of which the hitch assembly 55 may be connected to the hitch 65 of a truck or road tractor 66.

At its forward end the body 11 is provided with a front plate 67 which has a curved, upper rim 68 which is welded at its lower edge to a transverse plate 69 which in turn is welded to the body 11.

A latch is provided to latch the A frame 55 in the up position, as shown in Figure 2. The latch comprises a tongue 70 welded to and projecting outwardly from the transverse member 58 of the A frame 55, such tongue being formed with a hole 71. The latch also includes a hinge member 72 pivotally connected to brackets 73 which extend outwardly from and are fixed to the front portion 67 of the body 11. A torsion spring 74 is provided for a purpose described hereinafter. The hinge member 72 is formed with a slot 75 to receive the tongue 70, and a tapered pin 76 is provided which is intended to be received in the hole 71 and which is secured to the body 11 by means of a chain 77 to avoid losing it.

In operation the trailer thus described and illustrated is employed as follows:

The A frame 55 is hitched to a truck or a road type tractor such as shown at 66. The weight of the trailer forwardly and rearwardly of the axle 48 are roughly equal but when the empty trailer is hitched to a truck or road type tractor the rear end of the trailer will touch the ground as indicated in Figure 3. While in this position the rearward end of beds 20 of the channels 18 will be located at ground level. Hence, a tractor or other vehicle can be readily pushed or pulled onto the body 11 of the trailer, or it can be driven onto the body under its own power. The channels 18 meanwhile serve the purpose of guideways or tracks to guide the tractor or vehicle onto the body of the trailer.

In Figure 2 there is shown a tractor which is generally designated as 90. It has a motor 91, front wheels 92 and large, rear traction wheels 93. There is also shown attached to the tractor an attachment shown at 94, which may be a scraper, bulldozer or other type of attachment normally hitched to the tractor 90 and operated thereby. As the load illustrated by the tractor 90 is driven up onto the body 11 of the trailer and is propelled forwardly, the front end of the trailer will, of course, pivot to the horizontal position shown in Figure 2.

In the particular type of tractor for which the trailer of the present invention is primarily designed, the length of the trailer in relation to the length and design of the tractor are such that the large traction wheels 93 lie approximately over the axle 48.

If desired, the tractor may be lashed in position. However, unless the trailer is to be hauled over relatively steep grades, this precaution is unnecessary. The handbrakes of the tractor 90 may be used to prevent it rolling on its wheels.

The trailer and its load can be hauled very easily and rapidly from one location to another. When the destination has been reached the unloading operation can be carried out very rapidly and easily. Thus, the handbrakes of the tractor 90 are released, and if the tractor has been lashed in place, it is unloosed. Then the tractor is driven on its own power, or is pushed or pulled rearwardly. In so doing the tractor will rotate the body 11 of the trailer counterclockwise to assume the position shown in Figure 3. The tractor can then be easily rolled down the inclined body of the trailer onto the ground.

It will thus be apparent that a novel type of trailer has been provided which is light weight and economical in its construction, yet is sufficiently sturdy to support a relatively heavy load such as a grading type tractor. The main framework or body of the trailer consists of four identical body sections which are easily formed by conventional bending operations requiring no special tooling or equipment. These sections are joined together by longitudinal and transverse welds. The main longitudinal channels 18 provide sufficient depth to prevent a load from moving sideways, and they serve as guideways or tracks for guiding a vehicle onto the body of the trailer.

The channels 18, 26 and 31 also impart strength to the framework; i. e., in addition to the functions mentioned above, these channels are also structural members which provide strength and sturdiness.

The hitch assembly 14 is simple in its construction, it is easy to operate, and it is very sturdy and serves the intended purpose well. Being pivotally connected to the trailer body, it does not interfere with loading and unloading the trailer while hitched to a truck or road type tractor. The hitch can be latched in the position shown in Figure 2. The torsion spring 74 normally urges the hinge member 72 outwardly. Hence, when the trailer body rotates from the loading position shown in Figure 3 to the horizontal position shown in Figure 2, the hinge member 72 will not strike the tongue 70, hence will not be damaged. It can, however, be readily rotated to the latching position shown in Figure 5.

I claim:

1. A shallow bed trailer body of welded sheet metal construction adapted to carry a grading type tractor, said body comprising a pair of forward units arranged in side-by-side, abutting relation and a pair of rearward units arranged in side-by-side abutting relation, said forward and rearward pairs being arranged in end-to-end abutting relation, said pairs of units being welded together longitudinally and transversely at their abutting sides and ends; said units being formed to provide a deck extending longitudinally and centrally of the trailer body, a pair of oppositely directed channels disposed beneath said deck and extending longitudinally of the trailer body and along its center line, a pair of outer, inverted longitudinal channels serving as side walls of the trailer body and a pair of channels between said deck and outer channels adapted to receive and guide the wheels of a tractor or the like.

2. A tiltable trailer comprising a trailer body, a two wheel support therefor connected to the underside of the trailer body between the forward and rearward ends thereof and a hitch assembly for hitching the forward end of the trailer to a tractor, said hitch assembly being pivotally connected to the trailer body to allow tilting of the trailer body for convenience of loading and unloading while the trailer is hitched to a tractor; said trailer body comprising four identical sections each of integral sheet metal construction and each bent longitudinally to provide an outer, inverted channel, an upwardly opening channel adjacent said outer channel to serve as a trackway for wheels of a vehicle loaded onto the trailer, a deck portion adjacent the trackway and elevated with respect to the bottom of the trackway and an inner channel opening toward said outer channel and disposed below said deck portion; said sections being arranged in a forward pair and a rearward pair with the inner channels in side-by-side, abutting relation, with the sections of the forward pair in end-to-end abutting relation with the sections of the rearward pair, with said deck portions flush, said sections being welded together to provide a rigid trailer body.

References Cited in the file of this patent
UNITED STATES PATENTS

| | | |
|---|---|---|
| 1,941,400 | Johnson | Dec. 26, 1933 |
| 2,316,702 | McDaniel | Apr. 13, 1943 |
| 2,411,183 | Baldwin | Nov. 19, 1946 |
| 2,541,274 | Nixon | Feb. 13, 1951 |
| 2,569,965 | Wiedman | Oct. 2, 1951 |
| 2,628,126 | Black | Feb. 10, 1953 |
| 2,628,733 | Hale | Feb. 17, 1953 |
| 2,662,655 | Sellers | Dec. 15, 1953 |

FOREIGN PATENTS

| | | |
|---|---|---|
| 585,726 | Great Britain | Feb. 21, 1947 |